March 7, 1961  L. J. VAN NIEUWENHUYZEN  2,974,069
PREPARATION OF GELATINIZED STARCHES
Filed Oct. 23, 1957
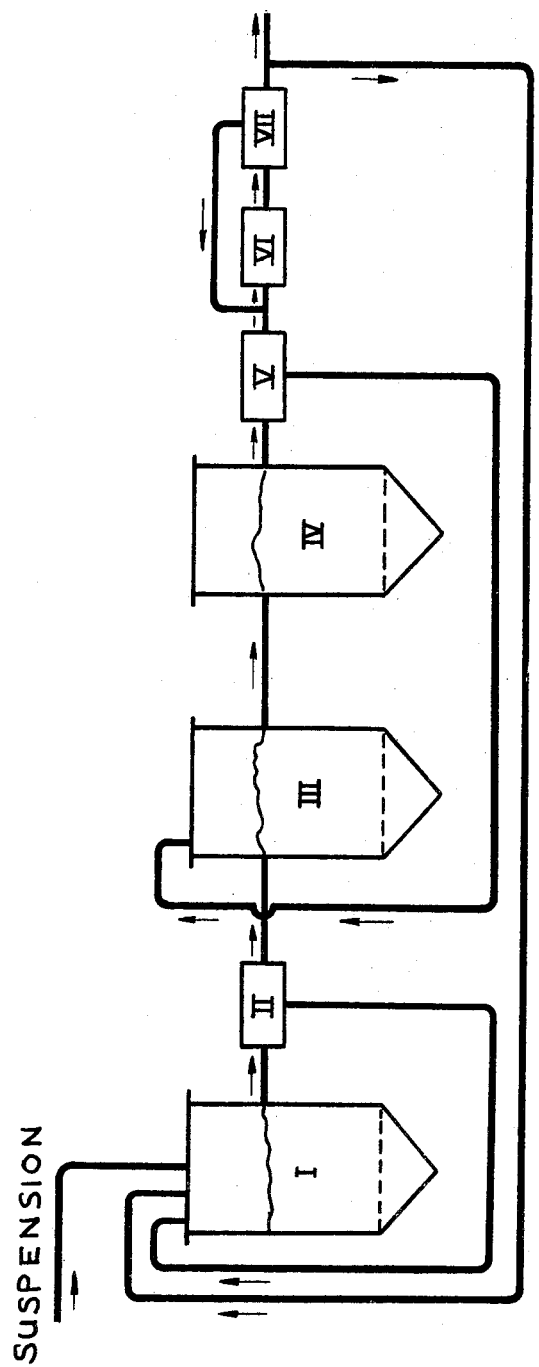

2,974,069
Patented Mar. 7, 1961

2,974,069

PREPARATION OF GELATINIZED STARCHES

Leendert J. van Nieuwenhuyzen, Steenbergen, Netherlands, assignor to Duintjer Wilkens Meihuizen & Co. N.V., Veendam, Netherlands Filed Oct. 23, 1957, Ser. No. 691,943

Claims priority, application Netherlands Oct. 24, 1956

6 Claims. (Cl. 127—71)

This invention relates to the preparation of dry products from starchy polysaccharides, which products swell or disperse in cold water.

The usual practice to prepare starches which disperse or swell in water at ordinary temperatures is to subject starch in the presence of water to a treatment on heated surfaces such as internally steam heated cylinders, whereby the starch is gelatinized and dried in the form of a thin film which is subsequently ground to flakes of the desired degree of fineness.

A principal object of the present invention is to provide a new convenient and economical process of producing starchy polysaccharides which swell or disperse in cold water.

In accordance with our invention starch polysaccharides are gelatinized and dried by exposing said polysaccharides in the presence of controlled amounts of water larger than the natural water content of the polysaccharide to the heat content of a dense liquid-like suspension of turbulent solids ranging in size from 10–5000 microns, which suspension of solids is kept at a temperature high enough to gelatinize the polysaccharide.

When referring to the dense liquid-like suspension of turbulent solids hereinafter, expressions such as "fluidized bed," "bed," "turbulent bed," "turbulent solids" and "auxiliary bed" are used. Any type of starchy polysaccharide may be employed in carrying out this invention, as, for example potato, corn, cassava, sago, wheat, rye, rice, barley and oat starches and flours. It is also possible to start from modified starches e.g. etherified or esterified starches, thin boiling starches or dextrin.

The moisture content of the starchy polysaccharide to be treated must be controlled within certain limits and should be higher than the natural moisture content of the given starchy polysaccharide. In its normal air-dry condition starch contains about 12–20% of moisture. According to the present invention water should be added to such starch in order to produce a starch having preferably a total moisture content within the range of about 30% to about 90% of water.

This range covers as well moist starch, which is still in a non-fluent state, as starch in the form of a starch and water suspension. The paste characteristics of the products obtained, such as the water binding capacity of the final product, depend a.o. upon the amount of water being present during the heat-treatment. By addition of chemicals such as alkali, acids, oxidizing chemicals, urea and formaldehyde to the water with which the starchy polysaccharide is premoistened, the water binding capacity of the final product may be varied.

The dense liquid-like suspension of turbulent solids may be obtained by passing an upflowing stream of gas at given velocities through a mass of solid particles of the proper grain size. These specific velocities which result in forming a fluidized bed are correlated with the size and density of the solid particles. Velocities known in the fluidization technique range from as low as 0.5 cm. per second to about 500 cm. per sec. The dense liquid-like suspension of turbulent solids may also be established by transmitting an oscillating motion generated by mechanical means to a mass of solids of the proper particle size. Through such beds, kept turbulent by oscillations, gases such as air, nitrogen and carbon dioxide may be passed, at velocities lying below the level necessary to give fluidization by the uprising gas alone.

Solids to be used in accordance with the present invention are primarily inert granular materials of the proper particle size. These solids act only as heat transferring media. As such may be used for instance metal balls, glass beads, beads of refractory material, enamel frit, thermostable plastic beads and sand. Preferred materials are those to which starch during its treatment shows a negligible surface adhesion. It has been discovered that the degree of surface adhesion of the starch to the inert material a.o. depends on the temperature at which the turbulent bed is held. Whenever the temperature of the bed material was about 20 centigrades higher than the boiling point of water at operating pressure, it could be observed that the surface adhesion of the starch to the inert material was low. This means that at amtospheric pressure the temperature in the turbulent mass should be at least 120° C., to minimize surface adhesion. For this reason these temperatures are preferred in combination with inert bed-materials.

Besides inert materials starch-based materials may be used as the auxiliary turbulent solids. As such native starch and modified starches, such as pregelatinized starch (reduced to the required fineness) are fit for use. In such processes the lower temperatures may be used, since no foreign materials are introduced in the final product.

The temperature of the auxiliary bed may range from temperatures sufficient to gelatinize the starchy polysaccharide, to temperatures insufficient to scorch the final product. The turbulent mass may be kept at any controlled temperature lying in the desired range by preheating the uprising stream of gas and by heat transferred from tubes directly inserted in the bed or from outside heat exchangers.

The moist starchy polysaccharide is fed onto the surface of the bed of turbulent solids or beneath the surface thereof. The introduction of starch into the bed and the discharge of the final product from the bed may occur either continuously or discontinuously. Moist starch which is still in a non-fluent state may be passed through a sieve and is thus supplied to the bed in a finely divided condition. Starch suspensions are introduced either by dripping or spraying.

The size of the suspension drops or of the moist non-fluent starch particles determines the behaviour of the starchy polysaccharide in the bed of turbulent solids. For, when the moist starch is introduced in the heated bed, the suspension drops or the moist starch particles are gelatinized to form granules and these granules are ultimately dried. The difference in sedimentation rate between the formed starchy granules and the particles of the bed material governs the time of residence of the starchy polysaccharide in the bed. The starch product may either sink to the bottom of the bed, may stay dispersed throughout the bed, may float on top of the bed or may be entrained by the stream of uprising gas. In those cases where classification occurs the starch product may be recovered by drawing off through a discharge or overflow conduit or by separating the entrained granules from the uprising stream of gas. When no classification occurs, separation from the bed material may be obtained by a screening operation.

By a proper selection of the reaction conditions gelatinization and drying may be controlled substantially independently of each other. The degree of gelatinization depends on the temperature in the bed, the moisture content of the starch, the humidity conditions in the bed and the time during which the starchy polysaccharide resides in the bed. Of these factors, the temperature should be high enough to attain gelatinization i.e. the temperature should be higher than the gelatinization temperature of the particular starchy polysaccharide. When chemicals are present that lower the gelatinization temperature of the starch, the temperature may be accordingly lower. The upper limit of the temperature depends on the requirement that the polysaccharide should not be scorched and is thus connected with the time of residence of the starchy polysaccharide in the bed. The other factors concerning the moisture conditions and the time of residence have been discussed above. It should be pointed out that the latter variable in most instances is also controlled by the depth of the bed. The time of contact between the starchy polysaccharide and the turbulent bed may vary within wide limits and range from a couple of seconds to a couple of hours.

For attaining complete gelatinization, drying should, initially, be kept at a minimum. This may be regulated by selecting the proper temperature. When the outer layer of the starchy polysaccharide drop or particle to be treated once has been gelatinized, owing to the greater resistance to dehydration thus obtained, the temperature may be increased, so that the gelatinization becomes more complete and drying can take place simultaneously. Therefore it may be of advantage to carry out the process in several steps. In using, for instance, potato starch as the polysaccharide to be treated in a discontinuous process the first phase may be carried out in a bed consisting of ground pregelatinized potato starch, held at a temperature of about 85° C. Then a partial gelatinization of the suspension drops to massive granules takes place, whereas strong drying is prevented.

Thereupon the temperature of the bed may be raised whereby the granules are gelatinized completely and dried simultaneously. It is also possible to carry out the second phase of the treatment in a separate auxiliary bed. The material coming from the first reactor is then separated, for instance by screening, into bed material and partially gelatinized granules. The former material may be recycled to the first reactor, while the partially gelatinized granules are fed to another or a series of other auxiliary beds, kept at higher temperatures.

These beds may consist of metal balls or sand, for instance. The conditions should be selected thus that classification occurs and that the starch product is easily separated from the bed material.

A preferred embodiment of the invention however is a one-step procedure in which moist starch is fed into a turbulent bed of inert material such as metal balls, which bed is kept at a temperature of 120° C. or higher at atmospheric pressure and whereby the final product either floats on top of the bed or is entrained by the uprising stream of gas and such may be easily separated from the bed material.

The new process gives a gelatinized starch in the form of granules. The granules may either be massive or porous. The products may be wetted up with cold water into a paste using from 1 part of water to 1 part of starch to about 20 parts of water to 1 part of starch, depending on the water absorption capacity of the basic starchy polysaccharide and the degree of gelatinization. The degree of gelatinization may range from products that swell to a limited extent in cold water, to products that swell and disperse completely in cold water. The products of the invention have the advantage of a lesser tendency to form lumps than roller-dried pregelatinized starches, when wetted up with water. The products may be used for the same purposes to which pregelatinized starches previously have been applied e.g. as thickening agents, as suspending agents, as sizing agents, as coating agents and for gluing purposes.

The invention provides an inexpensive method to expose moist starch to a medium kept at a uniform temperature and providing a rapid and efficient heat transfer.

The invention will be further illustrated, but is not limited, by the following examples:

*Example I*

A suspension of 1 part by weight of potato starch in 1 part by weight of water is sprayed continuously into a bed of fluidized sand particles. The average particle size of the sand is 400 microns. Air is used as the fluidizing gas at a velocity of about 20–25 cm. per second. The bed is kept at a temperature of about 200° C. After introduction the starch is retained in the bed for only a couple of seconds. Classification occurs and dry starch granules float on top of the bed, from where they are withdrawn through an overflow conduit.

The product obtained consists of porous starch granules which are partially gelatinized and are free of sand.

*Example II*

A suspension of 1 part by weight of cassava starch and 5 parts by weight of water is sprayed continuously into the bottom of a bed of fluidized metal balls. The metal balls, having a diameter of 400 microns, are fluidized by an uprising stream of air, the air having a velocity of 80 cm. per second.

The bed is heated by outside heat exchange to a temperature of 160° C. The starch is dispersed in the bed and passes upwardly through the bed in a couple of seconds. The dry granules are entrained in the uprising stream of air, from which they are recovered by a cyclone.

The product obtained may be made up into a paste containing 1 part of starch to 10 parts of cold water. The paste has a smooth texture and on standing will not set for a long time.

*Example III*

A suspension of potato starch and water in a weight ratio of 1:1 is sprayed onto the surface of a bed of ground pregelatinized potato starch, the bed having a temperature of about 90° C. The size of the ground pregelatinized starch is minus 40 mesh, while the gas velocity necessary for fluidisation amounts to 4 cm. per second. The solids leaving the reactor through an overflow conduit after an average time of residence in the bed of about 10 minutes, are separated by screening.

The massive starch granules carrying some bed material adhered to the surface are dried separately at a temperature of 110° C. The dry product obtained is ground. When stirring 1 part of the product into 20 parts of cold water a transparent paste is formed having the same consistency as pastes made from roller dried pregelatinized potato starch. The product according to the invention, however, exhibits a lower rate of swelling, resulting in a lesser tendency to form lumps.

*Example IV*

Suspensions of potato starch containing 60% moisture are acidified with HCl to pH values of 4.5, 3.8 and 3.0 respectively. These suspensions are treated in the manner described in Example I. The water binding capacity of the products obtained amounts to 13 parts, 9 parts and 4 parts of cold water respectively for 1 part of dry product.

*Example V*

Thin boiling corn starch is treated as illustrated in the single figure. A suspension containing 55% moisture is sprayed onto the surface of bed I. Bed I consists of ground pregelatinized thin boiling corn starch fluidized in a stream of gas and is kept at a temperature of 90° C. A mixture of starch granules and bed material is continuously withdrawn from reactor I. In II this mixture is separated by screening into a coarse fraction consisting of partially gelatinized thin boiling starch granules and a fine fraction consisting of bed material. The bed material is recycled to I. The starch granules are subjected to further treatment in the sand beds III and IV, respectively kept at a temperature of 105° C. and 120° C. The sand beds, containing particles up to 1000 microns, are kept turbulent by mechanical oscillations. The mixture of sand particles and starch granules which is continuously discharged from bed IV is separated in V. The sand is recycled to III. The starch product is ground in mill VI and classified in VII, giving a final product consisting of ground pregelatinized thin boiling corn starch. A part of the final product is used as the bed material in reactor I.

*Example VI*

Cassava starch with a moisture content of 40% is continuously supplied in a finely divided state to a turbulent bed made up of ground pregelatinized cassava starch, the bed being kept at a temperature of 90° C.

After an average contact time of 15 minutes a product is obtained which swells in cold water to a stable suspension of partially swollen starch granules.

Instead of pregelatinized cassava starch, native cassava starch may be used as the bed material.

Having thus described the invention, I claim:

1. A method for gelatinizing and drying a starchy polysaccharide comprising introducing said polysaccharide, having a moisture content of from 30% to 90%, into a mass of hot fluidized solid particles ranging in size from 10–5000 microns, the particles being kept at a temperature sufficient to gelatinize the starchy polysaccharide, but beneath that sufficient to scorch the same.

2. A method according to claim 1 in which the starchy polysaccharide is a suspension of starch and water.

3. A method according to claim 1 in which the mass of fluidized solid particles is obtained by passing an upwardly directed stream of gas at velocities ranging from 0.5 cm. per second to about 500 cm. per second through a mass of solid particles ranging in size from 10–5000 microns.

4. A method for gelatinizing and drying starchy polysaccharides comprising introducing said polysaccharides, containing 30% to 90% moisture, into a mass of hot fluidized inert solid particles ranging in size from 10–5000 microns, the inert particles being kept at a temperature sufficient to gelatinize the starchy polysaccharide, but beneath that sufficient to scorch the same.

5. A method according to claim 4 in which the inert hot fluidized solid particles are kept at a temperature which is at least 20° C. higher than the boiling point of water at operating pressure.

6. A method for gelatinizing and drying starchy polysaccharides comprising introducing said polysaccharides, containing 30% to 90% moisture, into a mass of hot fluidized pregelatinized starch particles ranging in size from 10–5000 microns, the pregelatinized starch particles being kept at a temperature between the gelatinization temperature of the starchy polysaccharide and about 120° C.

References Cited in the file of this patent

UNITED STATES PATENTS

| | | |
|---|---|---|
| 1,035,833 | Anderson | Aug. 20, 1912 |
| 1,133,914 | Bergh | Mar. 30, 1915 |
| 1,157,738 | Tyler | Oct. 26, 1915 |
| 1,516,512 | Stutzke | Nov. 25, 1924 |
| 1,901,109 | Maier | Mar. 14, 1933 |
| 2,177,378 | Schorn | Oct. 24, 1939 |
| 2,314,459 | Salzburg | Mar. 23, 1943 |
| 2,481,436 | De Haven Miller | Sept. 6, 1949 |
| 2,845,368 | Fredrickson | July 29, 1958 |